Patented June 14, 1927.

1,632,252

UNITED STATES PATENT OFFICE.

KARL THIESS, CARL JOSEF MÜLLER, AND ERNST RUNNE, OF HOCHST-ON-THE-MAIN, AND ALBERT SCHAEFFER, OF MARXHEIM-ON-THE-TAUNUS, GERMANY, ASSIGNORS TO GRASSELLI DYESTUFF CORPORATION, OF NEW YORK, N. Y., A CORPORATION OF DELAWARE.

THIOINDIGO VAT DYESTUFFS AND PROCESS OF MAKING SAME.

No Drawing. Application filed June 22, 1926, Serial No. 117,850, and in Germany June 27, 1925.

Our present invention relates to a new process for producing hexa-substituted thioindigo vat dyes.

We have found that 6-6'-dihalogen-4-4'-dimethylthioindigo can be halogenated so as to yield tetrahalogendimethyl thioindigo which gives on cotton very useful bright reddish-violet tints of a normal tinctorial power which resemble the dyeings obtainable by means of 5-5'-dihalogen-7-7'-dimethylthioindigo. The dyeings are, in contrast to those produced by most of the thioindigo dyestuffs, absolutely fast to boiling and therefore the new dyestuff may be utilized for certain purposes which require the use of dyestuffs of an extremely good fastness to boiling, for instance for the dyeing of articles to be bleached.

The halogen enters into the two 5-positions of the molecule and not the 7-positions. The effect of the halogenation is surprising. It was to be presumed that the halogen would enter into the 7-position which is not hindered by two ortho-situated substituents and that the tinctorial power of the dyestuff would be considerably weakened by the hexa-substitution.

We have moreover found that the introduction of halogen into the 5-position can not only be effected in the 6-6'-dihalogen-4-4'-dimethylthioindigo, but also in the 6-6'-4-4'-tetrahalogenthioindigo and also in the 6-6'-4-4'-tetramethylthioindigo and likewise in the 4-4'-dihalogen-6-6'-dimethylthioindigo. The dyestuffs thus obtained which possess a normal tinctorial power, dye cotton violet to violet-red shades of excellent fastness to boiling.

The halogenation can be performed by one of the known methods, while taking precautions as usual in halogenating processes.

In our new process the use of chlorosulfonic acid as diluent has proved to be particularly suitable, also a mixture of chlorosulfonic acid with anhydrous sulfuric acid. When using chlorosulfonic acid together with bromine, regard must be had to the oxidation of the hydrobromic acid which is formed in this case.

For the purpose of accelerating the halogenating process there may be advantageously added a catalyst, such as iodine antimony pentachloride or a solvent capable of dissolving halogen, such as chlorobenzene, phosphorous oxychloride or halogenated hydrocarbons.

The following examples serve to illustrate our invention, but are not intended to limit it thereto:

1. 20 parts by weight of 6-6'-dichloro-4-4'-dimethylthioindigo are slowly introduced, while well cooling, into 6–10 times the quantity of chlorosulfonic acid. As soon as the dyestuff has passed into solution, a solution of about 10 parts of bromine in 3 times the quantity of chlorosulfonic acid is run into the mixture, which is then stirred for 2–3 hours. After the mass has been poured on ice and worked up, the 5-5'-dibromo-6-6'-dichloro-4-4'-dimethylthioindigo is obtained which dyes cotton bright reddish-violet tints.

2. 20 parts by weight of 6-6'-dichloro-4-4'-dimethylthioindigo are suspended in 10–15 times the quantity of nitrobenzene and mixed with 18–20 parts of bromine. After having stirred the mixture for a short time at ordinary temperature, it is slowly heated to 130–140°. As soon as the evolution of hydrogen bromide has ceased, the nitrobenzene is heated for a short time to boiling and the whole is allowed to cool.

The dyestuff, after being freed from nitrobenzene, dyes cotton from a yellow vat reddish-violet tints which very much resemble those obtainable according to Example 1.

3. 20 parts by weight of 6-6'-dichloro-4-4'-dimethylthioindigo are introduced, while well cooling, into 6–10 times the quantity of chlorosulfonic acid. There is added a very little quantity of iodine and then are gradually introduced 15 parts of chlorine. The whole is then again stirred for a little while and then poured on ice. The isolated dyestuff, which constitutes 5-5'-6-6'-tetrachlor-4-4'-dimethylthioindigo, dyes cotton fast reddish-violet tints. The dyeings produced thereby are even somewhat brighter than those obtainable according to Examples 1 and 2.

4. 20 parts by weight of 4-4'-dichloro-6-6'- dimethylthioindigo are suspended in 15-20 times the quantity of nitrobenzene and on addition of 18 parts of bromine the whole is gradually heated to 130°. After the evolution of hydrogen bromide has ceased, the mixture is heated to boiling for a short time, whereupon it is cooled and filtered. The new dyestuff thus produced constitutes 4-4'-dichloro-5-5'-dibromo-6-6'-dimethylthioindigo and dyes cotton very bright reddish-violet shades of excellent fastness.

5. 43,4 parts by weight of 4-4'-6-6'-tetrachlorothioindigo are dissolved, while well cooling, in 6–10 times the quantity of chlorosulfonic acid; on addition of a very little quantity of antimony pentachloride there are very slowly introduced about 35–40 parts of chlorine. The mixture, after having stirred it for a little while, is poured on ice, filtered and washed until it is neutral. The 4-4'-5-5'-6-6'-hexachloro thioindigo forms a claret-red powder which gives on cotton extremely fast violet tints.

6. If for the 6-6'-dichloro-4-4'-dimethyl-thioindigo, as used in Example 3, is substituted the same parts by weight of 4-4'-dichloro-6-6'-dimethylthioindigo, a dyestuff dyeing quite similar tints is obtained which constitutes the hitherto unknown 4-4'-5-5'-tetrachloro-6-6'-dimethylthioindigo.

We do not claim as new products the dyestuffs of the formula:

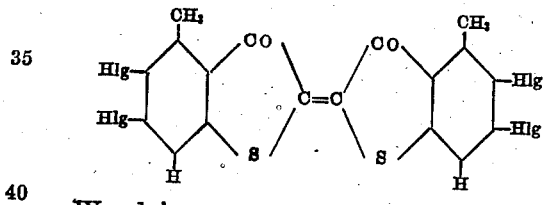

We claim:
1. Process of producing hexa-substituted thioindigo vat dyestuffs, consisting in halogenating a thioindigo compound of the following constitution:

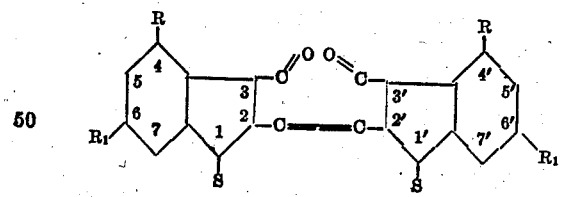

wherein R and R₁ represent halogen or a methyl group.

2. Process of producing hexa-substituted thioindigo vat dyestuffs, consisting in halogenating 6-6'-dihalogen-4-4'-dimethylthioindigo.

3. Process of producing hexa-substituted thioindigo vat dyestuffs, consisting in halogenating 6-6'-dichloro-4-4'-dimethylthioindigo.

4. Process of producing hexa-substituted thioindigo vat dyestuffs, consisting in chlorinating a thioindigo compound of the following constitution:

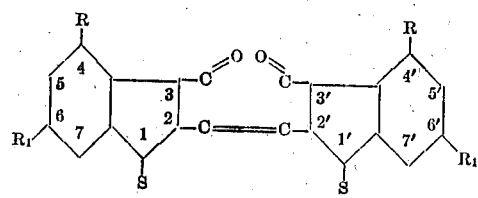

wherein R and R₁ represent halogen or a methyl group.

5. Process of producing hexa-substituted thioindigo vat dyestuffs consisting in chlorinating 6-6'-dihalogen-4-4'-dimethylthioindigo.

6. Process of producing hexa-substituted thioindigo vat dyestuffs, consisting in chlorinating 6-6'-dichloro-4-4'-dimethylthioindigo.

7. As new products hexa-substituted thioindigo vat dyestuffs of the following constitution:

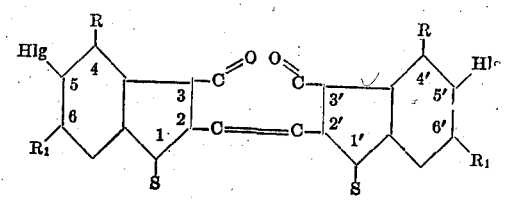

wherein R and R₁ represent halogen or a methyl group.

8. As a new product, the herein described thioindigo vat dyestuff of the following constitution:

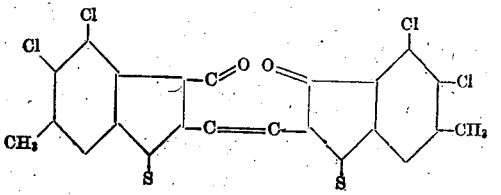

9. Materials dyed with the new dyestuffs of claim 7.

10. Materials dyed with the new dyestuff of claim 8.

In testimony whereof, we affix our signatures.

KARL THIESS.
CARL JOSEF MÜLLER.
ERNST RUNNE.
ALBERT SCHAEFFER.